UNITED STATES PATENT OFFICE.

BASIL W. BOESCH, OF BOSTON, MASSACHUSETTS.

PROCESS OF MAKING CELLULOSE ACETATE.

SPECIFICATION forming part of Letters Patent No. 708,456, dated September 2, 1902.

Application filed June 25, 1901. Serial No. 65,937. (No specimens.)

*To all whom it may concern:*

Be it known that I, BASIL W. BOESCH, of Boston, in the county of Suffolk and State of Massachusetts, have invented an Improvement in the Manufacture of Cellulose Acetates, of which the following is a specification.

My invention relates to the manufacture of cellulose esters, and especially to the manufacture of cellulose acetates by treatment of the cellulose compound known as "viscose," which is the raw material of the process of my invention.

I have discovered that viscose, which is commonly regarded as the sodium or potassium salt of cellulose xanthic acid prepared after the manner set forth in United States Patent No. 520,770 to Cross, Bevan, and Beadle, is, especially when in the anhydrous condition, highly reactive with the anhydrids of organic acids and their chlorids or similar halogen compounds. This reactivity I find to be greater than is possessed by normal cellulose, as cotton or other fibrous forms of cellulose, and even greater than is shown by the secondary or hydrated forms of cellulose— for example, the modified cellulose recovered from viscose after the manner set forth in United States Patent No. 604,206, also to Cross, Bevan, and Beadle. In the process of my invention this greater reactivity of viscose is made available in the direct production of cellulose esters—as, for example and more especially, cellulose acetates—by treatment of dry viscose with a mixture of the organic anhydride and chlorid. The action of the organic chlorid or similar organic halogen compound is to split off the sodium or potassium through combination with the halogen and formation of an alkaline haloid salt, as a result of which the acid radical enters into combination with the cellulose molecule with formation of the cellulose ester. The dry viscose thus obtained contains approximately cullulose, sulfur, and sodium or potassium in the proportions of one hundred to twenty to ten.

The process of my invention is generally applicable to the production of cellulose esters by treatment of the dry viscose with the anhydrides and chlorids of the radical appropriate for the desired ester. In the production of cellulose acetate, for example, I proceed as follows: The dry viscose prepared as above described is treated with a mixture of acetyl chlorid and acetic anhydride in varying proportions according to the degree of acetylation which it is necessary to obtain and also to the amount of moisture still remaining in the viscose. The usual proportions for the preparation of cellulose tetracetate are: twenty-five parts of dry viscose, sixteen parts of acetyl chlorid, twenty parts of acetic anhydride, the latter being in excess in order to bind the moisture (water or alcohol) finally retained by the viscose and also for definitely saturating the viscose hydroxyls with acetyl radicals. As the reaction is a very energetic one, the container or acetylizing apparatus with the viscose in it is preferably thoroughly chilled before addition of the acetyl chlorid and acetic anhydride. It is also well to previously chill these chemicals. After gradual addition of the cooled acetyl chlorid and acetic anhydride the temperature rises very quickly to about 60° to 70° centigrade, and should be kept down as much as possible, at least in the first stage of the process. After addition of the whole quantity of the above chemicals and thorough stirring of the mixture, a solvent is added in order to carry the reaction to the end. This solvent may be chloroform, nitrobenzene, nitrotoluene, glacial acetic acid, or others, or a mixture of them. For the preparation of lower acetates—as, for instance, the triacetate—less acetyl chlorid is taken and acetone used as a solvent. After addition of the solvent, which should be taken in a quantity sufficient to dissolve the theoretical amount of cellulose acetate formed— *i. e.,* about ten times the weight of cellulose contained in the viscose originally taken—the container or apparatus is heated for several hours until substantially all the viscose has gone into solution, and during this heating the temperature should not exceed 100° centigrade. After conclusion of the reaction the solution of acetate in the particular solvents selected as above is poured into an equal bulk of ethyl alcohol, which precipitates the acetate. After separation of the precipitated acetate by filtration from the alcoholic mixture containing the solvent the acetate is washed with fresh alcohol, or boiled with water, until the last traces of alcohol or solvent have been boiled off.

I claim—

1. The process of preparing cellulose esters, which consists in removing the alkali metal of the viscose with formation of a haloid salt in presence of an organic acid radical.

2. The process of preparing cellulose acetate, which consists in removing the alkali metal of the viscose with formation of a haloid salt in presence of the radical of a fatty acid.

3. The process of preparing cellulose acetate which consists in removing the alkali metal from viscose with formation of a haloid salt in presence of acetyl.

In testimony whereof I have signed my name to this specification in the presence of two subscribing witnesses.

BASIL W. BOESCH.

Witnesses:
B. J. NOYES,
JOHN W. DECROW.